Oct. 15, 1935.  W. LA HODNY  2,017,627
MOUNTING FOR PLATES
Filed Nov. 4, 1933    2 Sheets-Sheet 1

INVENTOR
William L^a Hodny
by Parker, Brockrow & Palmer
ATTORNEYS

Oct. 15, 1935.  W. LA HODNY  2,017,627
MOUNTING FOR PLATES
Filed Nov. 4, 1933   2 Sheets-Sheet 2
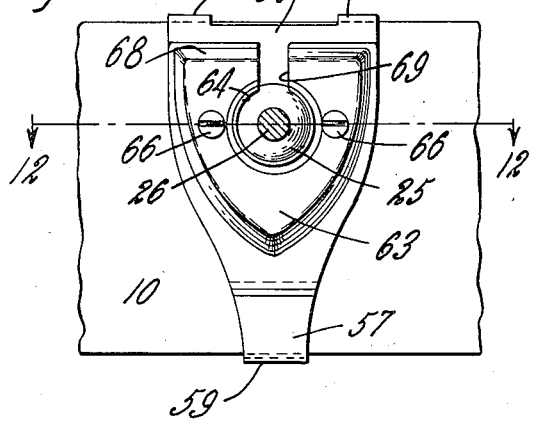
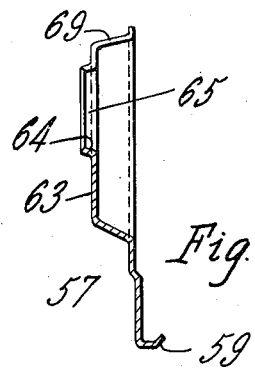
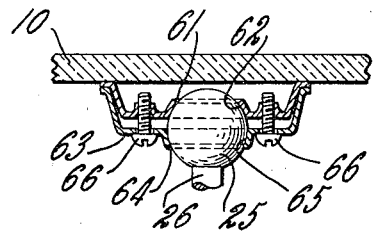
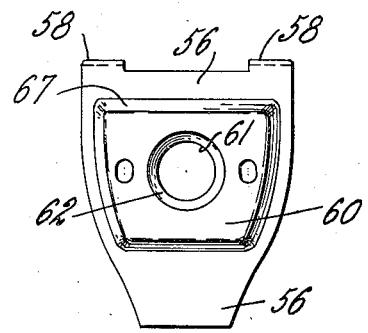
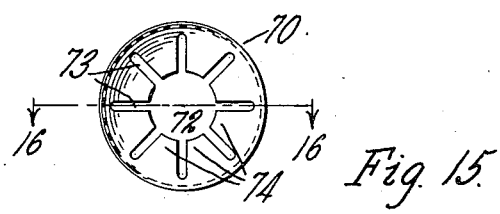
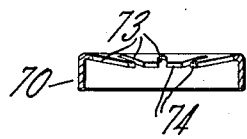
INVENTOR
William La Hodny
by Parker, Prochnow & Farmer
ATTORNEYS Patented Oct. 15, 1935

2,017,627

UNITED STATES PATENT OFFICE 2,017,627

MOUNTING FOR PLATES

William La Hodny, Buffalo, N. Y.

Application November 4, 1933, Serial No. 696,654

8 Claims. (Cl. 88—98)

This invention relates to supporting devices, and, particularly, to the mounting of plates such as the reflecting elements of rear view mirrors.

An object of this invention is to provide an improved mounting for a plate, such as the plate of a rear view mirror, which may be made partially of drawn sheet metal stampings, which will permit adjustment of the plate into a plurality of different positions, and which will be relatively simple, strong, dependable and inexpensive.

Another object of the invention is to provide an improved mounting for plates, with which a plate may be detachably and firmly mounted during the assembly of the mounting elements, and which will be compact and attractive in appearance.

Other objects and advantages will be apparent from the following description of several embodiments of the invention, and the novel features will be particularly pointed out hereinafter in the appended claims.

In the accompanying drawings:

Fig. 11 is a sectional elevation of another mirror plate and its mounting, also constructed in accordance with the invention, but illustrating still another embodiment thereof;

Fig. 12 is a sectional plan of the same, the section being taken approximately along the line 12—12 of Fig. 11;

Fig. 13 is a sectional elevation of one of the clamping members of the same;

Fig. 14 is a transverse sectional elevation of the other clamping members of the same;

Fig. 15 is a face view of a resilient seat for the ball or spherical head which may be used in Figs. 5 and 8 in place of the split ring and rubber disc; and Fig. 16 is a sectional elevation of the same, the section being taken approximately along the line 16—16 of Fig. 15.

Figure 1:
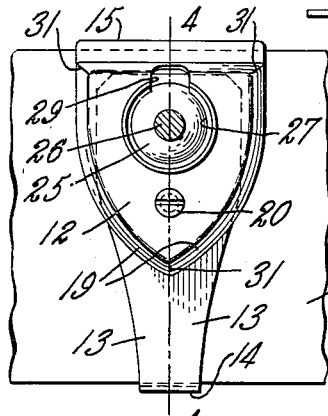
Fig. 1 is a sectional elevation of a rear view mirror utilizing one embodiment of the invention, the section being taken approximately along the line 1—1 of Fig. 2.

In the embodiment of the invention illustrated in Figs. 1 to 4, the invention is incorporated in a rear view mirror, such as is commonly employed in automobiles for the purpose of enabling the driver of the automobile to view the approach of vehicles from the rear without the necessity of turning around. Such a rear view mirror includes a reflecting plate or member 10, such as a plate of glass having a reflecting coating applied to the rear face thereof, and this invention relates particularly to the mounting of such a reflecting plate. This reflecting plate 10 is commonly rectangular in shape and is provided with beveled marginal edges 11.

A pair of sheet metal coupling members 12 and 13 are disposed face to face in overrunning relation to one another, and the two members so arranged are disposed against the rear or coated face of plate 10, with the overrunning ends of the members 12 and 13 extending beyond opposite edges of the plate 10. The overrunning end of the under member 13 is bent back upon itself to form a hook 14 which receives and holds one beveled edge of plate 10, and the opposite overrunning end of the other or outer member 12 is similarly bent back upon itself to form a hook 15 which receives and holds the opposite beveled edge of the plate 10.

Figure 3:
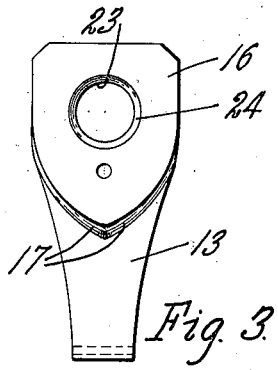
Fig. 3 is a face elevation of one of the overrunning parts which clamps the mirror plate.

Each of these members 12 and 13 is formed of sheet metal stampings, and the under member 13, in the portion covered by the member 12, is provided with a somewhat tubular or upstanding boss 16 which is drawn upwardly or outwardly from the member, and this boss may have its side wall 17, which is nearest the hook 14, somewhat V-shaped when viewed in front elevation, as shown in Fig. 3. This side wall 17 is also inclined to the plane of the coated face of the plate 10 to which it is applied, and the angle of inclination is less than 90°.

Figure 2:
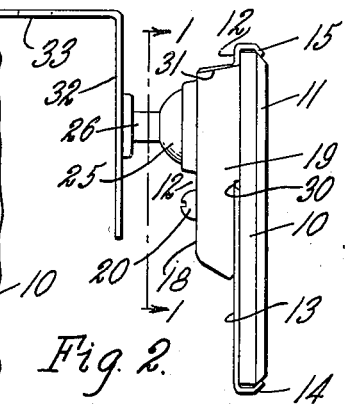
Fig. 2 is a side elevation of the same.
Figure 4:
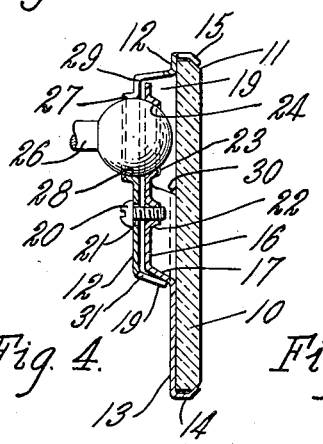
Fig. 4 is a transverse sectional elevation of the mirror plate and mounting of the same, the section being taken approximately along the line 4—4 of Fig. 1.

The outer member 12 has drawn therefrom a tubular boss 18 which fits over, and nests with, the boss 16 of the under member, and for this purpose the tubular boss is also somewhat V-shaped when viewed in front elevation, as shown in Fig. 1, and the side wall 19 of the lower end of this boss which fits over the side wall 17 of the under member 13 preferably is also given an inclination so that when the bosses of the two members 12 and 13 are caused to nest, as shown in Figs. 1, 2, and 4, the side wall 19 of the boss of the outer member will be cammed in one direction by the inclined wall 17 of the boss of the under member 13, and its camming is in a direction to draw the two hooks 14 and 15 toward one another so as to tightly clamp the plate 10 between them.

This cam action between the member takes place when the members are drawn together face to face in nesting relation, and they may be drawn together for this purpose in any suitable manner such as by a screw 20 which passes through a slot or aperture 21 in the end face of the boss 18 of the outer member and is threaded into an aperture in the end face of the boss 16 of the under member. Since the parts are made of sheet metal, the metal surrounding the aperture into which the screw 20 is threaded is punched or drawn in forming the aperture in a manner to provide a flange 22 (Fig. 4) so as to give a substantial passage that may be threaded to receive the screw 20. The slot 21 may be an aperture made larger than the shank of the screw 20, so that as the screw 20 is tightened, the outer member 12 may move transversely of the screw as the side wall 19 of the boss of the outer member rides down the incline of the side wall 17 of the boss 16 of the under member 13, which occurs when the hooks 14 and 15 are brought together. If desired, the slot 21 may be elongated in the direction of movement of the member 12 when clamping the hooks 14 and 15 to the plate 10.

The end face of the boss 16 is provided with an aperture 23, Figs. 3 and 4, and the wall immediately surrounding this aperture is bent concavely into the form of a segment of a sphere, so as to provide a concave ringlike seat 24 which receives a spherical head or ball 25 that is carried on the end of a supporting stud 26. The end face of the boss 18 of the outer member 12 is also provided with an aperture 27 which is aligned with the aperture 23, and the portion of the wall of this member immediately surrounding the aperture 27 is flanged outwardly in the form of a segment of a sphere so as to provide a concave seat 28 which faces the concave seat 24 of the under member. The seat 28 of the outer member bears on the spherical head 25 and confines it to the seat 24 of the under member.

It will be noted, from Fig. 4, that the upper end of the boss 16 of the under member is nowhere in contact with the plate 10 and, therefore, the tightening of the screw 20 not only causes the movement of the hooks 14 and 15 toward one another while clamping the plate 10, but also since the screw is located between the inclined wall 17, where the actual cam action occurs, and the unsupported upper end of the under member 13, the screw, when tightened, will draw the seat 24 against the spherical head 25, thereby flexing the boss somewhat and creating a resilient frictional pressure of the seat on the ball or head, which retards rocking or rotation of the head or ball 25 in the socket provided by the seats 24 and 28.

The outer member 12 may also be provided with a slot 29 extending from the aperture 27 upwardly for some distance, which allows the seat 28 to spring slightly when the screw 20 is tightened and thus provides a further resilient, frictional pressure on the head 25 to retard its movement in the socket. The inclined side wall 19 of the outer member 12 is also provided with a notch 30 (Figs. 2 and 4) to receive the flat portion of the under member 13, which makes it possible for that portion of the member 12 above the flat portion of the under member 13 to fit rather closely to the rear face of the plate 10.

If desired, the formation of the boss 18 of the outer member 12 may be expedited by providing slits 31 at the lowermost point, which is at the V, and also at the upper corners of the boss. The supporting stud 26 may be connected to any suitable supporting part, such as by riveting its free end to the depending arm 32 of a supporting bracket 33 that is attached, in any desired or usual manner, not shown, to the body of the vehicle.

In the assembly of such a mounting, the members 12 and 13 are brought together face to face, with the bosses 16 and 18 loosely nesting and with the ball 25 confined between the seats 24 and 28. The screw 20 is passed through slot 21 and into the boss 16, but not tightened, so that the members 12 and 13 are not drawn tightly together. The members 12 and 13 at this time have the maximum amount of overrun which is permitted. The plate 10 is then slid endwise into a position between the hooks 14 and 15, and the screw 20 then tightened which draws the members 12 and 13 into closer face to face relation.

During this movement of the members 12 and 13 into closer nesting relation the side wall 19 of the boss 18 of the outer member will slide along the side wall 17 of the boss 16 of the under member 13, and in doing so the outer member is cammed downwardly so as to decrease the extent of overrun between the members, which action draws the hooks 14 and 15 toward one another and into tightly clamping relation with the plate 10. At the same time the free or upper end of the boss 16 of the under member 13 will be drawn toward the boss 18 and this will carry the seat 24 tightly against the head 25 so as to frictionally secure it against movement in the socket.

By tightening the screw 20 to different extents the degree of friction or pressure which may be created on the ball or head 25 may be varied, and the portion of the boss 16 which carries the seat 24 may flex at the portion around the screw 20 when the screw 20 is tightened. This gives a resilient, continuing pressure of the seat 24 on the ball or head 25, and the slot 29 also allows a limited stretching or enlargement of the seat 28 of the outer member which gives a further resilient gripping of the ball 25. The stud 26 is, of course, passed through the aperture 27 before the members 12 and 13 are brought together and the free end of the stud 26 is then riveted or otherwise secured to the depending arm 32 of the supporting bracket 33.

By having the cooperating walls 17 and 19 of the nesting bosses arcuate or V-shaped, the nesting of these walls will prevent lateral movement of the members and a single screw 20 is sufficient to couple them. With this arrangement, the mirror plate 10 and the coupling members 12 and 13 may be adjusted together on the ball or head 25 into a plurality of different angular positions with respect thereto. The use of the ball thus provides an articulated or universal joint enabling adjustment of the plate 10 in almost any direction within the limits permitted by the articulated joint at the head 25.

Figure 6:
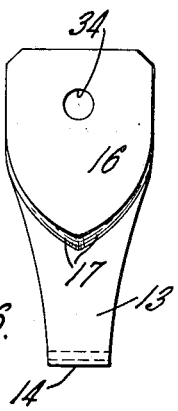
Fig. 6 is a face elevation of one of the overrunning parts of the same.
Figure 5:
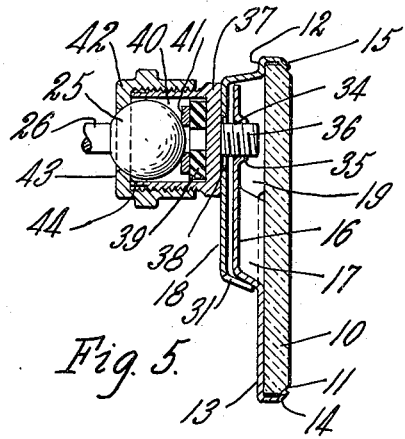
Fig. 5 is a transverse section elevation of a mirror plate and mounting, also constructed in accordance with the invention but illustrating another embodiment thereof.

In Figs. 5 and 6 a modification of this invention is disclosed. The coupling members 12 and 13 are formed the same as in Figs. 1 to 4, except that seats 24 and 28, the screw 20, the slot 21 and the flange or boss 22 are omitted. The end face of the boss 16 of the under member 13 is provided with an aperture 34 which is reinforced by punching the aperture to form a flange 35, and this aperture 34 is threaded to receive a threaded stud 36 which projects from the end of a cup-shaped element 37. The bottom of this cup-shaped element 37 is disposed flat against the outer face of the end of the boss 18 of the member 12, and the stud 36 passes through a slot 38 in the boss 18. By turning the element 37 the stud 36 will be threaded further into the boss 16 of the member 13 and will draw the members 12 and 13 into closer nesting relation. The cooperating side walls 17 and 19 of these members will cause a movement of the hooks 14 and 15 into clamping engagement with the opposite edges of the mirror plate 10 as the members 12 and 13 are drawn into closer nesting relation. The slot 38 is of a sufficient size to permit this limited movement of the members 12 and 13, which draws the hooks 14 and 15 toward one another.

Figure 10:
Fig. 10 is an elevation of the split ring forming a seat for the ball, which may be used in the mounting means of Figs. 5 and 8.

An annular disc 39 of soft resilient rubber is disposed against the inner or closed end of the cavity 40 of the element 37, and a metal ring 41 (Figs. 5 and 10), which is preferably split, is disposed flat against the face of the rubber disc 39. This split ring 41 is somewhat smaller in diameter than the diameter of the cavity 40. The ball or head 25 which is carried by the supporting stud 26 is disposed in the cavity 40 against the split ring 41, and the ball seats itself in the aperture of this split ring as shown clearly in Fig. 5.

A retaining ring 42 is threaded over the outside of the element 37 and is provided at its outer end with an internal flange 43 which extends partially across the open end of the cavity 40 and engages with the ball or head 25 and confines it within the cavity 40 and in contact with the split ring 41. This ring 42 has an abrupt shoulder 44 which seats against a corresponding shoulder of the element 37 when the ring is threaded to the maximum intended extent up on the element 37, and this abrupt shoulder on the element 37 may for convenience be the outer end face of the element 37, in which case the shoulder 44 of the ring may be the inner face of the flange 43. The frictional contact between the abutting shoulders of the ring 42 and element 37 acts on the principle of a lock washer to resist unscrewing of the ring 42 through force exerted on the ring by the ball 25 as the latter rocks in cavity 40.

The depth of the cavity 40 is such that when the ring 42 is threaded upon the element 37 to the maximum extent intended, the ball or head 25 will be forced tightly against the split ring, which forms a metal seat therefor, and the split ring stresses the rubber disc 39 and thus provides a yielding, frictional pressure on the ball 25. The split ring 41 is preferably formed of resilient metal so that it may resiliently spread slightly or enlarge through pressure thereon of the ball, and thus provide an additional resilient force acting on the ball 25 to compensate for wear between the ball and its seat. This provides another type of universal joint between the supporting stud 26 and the coupling members 12 and 13. The stud 26 is attached to the automobile body in any suitable manner such as through the bracket 33.

Figure 7:
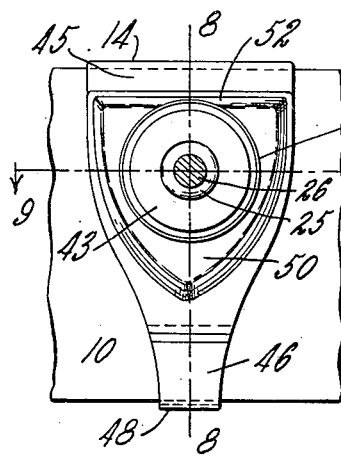
Fig. 7 is a sectional elevation of the mirror plate and another mounting also constructed in accordance with the invention but illustrating still another embodiment thereof.
Figures 8, 9:
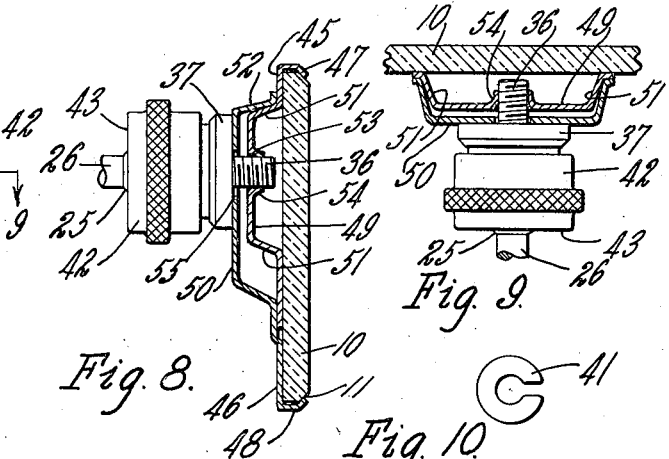
Fig. 8 is a transverse sectional elevation of the same, the section being taken approximately along the line 8—8 of Fig. 7.
Fig. 9 is a sectional plan of the same, the section being taken approximately along the line 9—9 of Fig. 7.

In the embodiment of the invention illustrated in Figs. 7, 8, and 9, the coupling members 45 and 46 which are somewhat similar to the members 12 and 13, are also disposed in overrunning, face to face relation to one another and against the coated face of the mirror plate 10. The under member 45, at its overrunning end is provided with a hook 47 which receives and clamps against one beveled edge of the mirror plate 10. The opposite and overrunning end of the member 46 is also provided with a hook 48 which engages and clamps the opposite beveled edge of the mirror plate 10.

The under member 45 is provided with an outwardly drawn tubular boss 49 which is everywhere spaced from the edge of the member by a flat marginal area of substantial proportions, as shown clearly in Figs. 8 and 9. Similarly, the outer member 46 is provided with a larger, drawn tubular boss 50 which nests over the boss 49. The side wall 51 of the boss 49 of the under member 45, along the upper portion of the boss, is given an acute inclination to the rear face of the plate 10 and the corresponding side wall 52 of the boss 50 rides upon the inclined side wall 51 so as to be cammed upwardly thereby, when the members are drawn together face to face in closer relationship. This cam action decreases the extent of overrun of these coupling members 45 and 46 and consequently draws the hooks 47 and 48 toward one another and into firm clamping relation with the opposite edges of the mirror plate 10.

The end face of the boss 49 has an aperture 53 punched therein so as to provide a reinforcing flange 54 that will receive threads for an appreciable distance, and into this aperture 53 one may thread the stud 36 of the cup-shaped element 37 described in connection with Fig. 5. The end face of the boss 50 of the outer coupling member, is provided with an elongated slot 55 through which the threaded stud 36 extends and which permits of a limited relative movement of the members 45 and 46 as they move into and out of clamping engagement with the opposite side edges of the mirror plate 10.

The assembly and operation of this embodiment of the invention is similar to that of the construction described in connection with Fig. 5, except that the bearing or cam action between the bosses of the two members occurs at the upper portion of the nesting bosses, instead of at the lower edge as in Figs. 1 to 5. In the embodiment of the invention shown in Figs. 7 to 9 the slits 31 are omitted, and the bosses are drawn from the interior area of the body of the sheet metal. The boss 50, in the particular example shown, has the appearance somewhat of the shape of a sad iron. Since the bosses 49 and 50 nest fairly closely on their side vertical edges (Fig. 9), relative movement of the coupling members 45 and 49 sidewise will be prevented.

In the embodiment of the invention illustrated in Figs. 11 to 14 the coupling members 56 and 57 are also disposed face to face in overrunning relation, and are also formed of sheet metal. The member 56, at its outer overrunning end, is bent upon itself to form hooks 58 which receive and grip one beveled edge of the plate 10, and the other member 57 at its outer overrunning end is similarly bent to provide a hook 59 which engages the opposite beveled edge of the mirror plate 10. The member 56 (Fig. 14) is provided with a tubular boss 60 which is drawn outwardly from the interior of its face area, preferably of the shape similar to the boss 49 of Figs. 7 to 9.

The end wall or face of the boss 60 is provided with an aperture 61, and the portion of the wall surrounding the aperture is flanged in to the shape of a segment of a sphere to provide a concave seat 62 which receives the head 25 of stud 26. The outer member 57 is provided with a drawn boss 63, which is similar in shape to the boss 50 of Figs. 7 to 9, but it is provided with an aperture 64 which is aligned with the aperture 61. The portion of the wall surrounding the aperture 64 is flanged outwardly and formed into the shape of a segment of a sphere, so as to provide a concave seat 65 which also engages the ball or head 25 and confines it to the seat 62. Screws 66 are passed through slots or apertures in the boss 63, one at each side of the aperture 64, and threaded into boss 60 of the under member 56, in the manner in which the screw 20 of Figs. 1 to 4 is threaded into the boss 16.

The upper side wall 67 of the boss 60 of the under member 56, is also acutely inclined to the plane of the coated face of the mirror plate 10, the same as the inclined wall 51 of Figs. 7 to 9. The upper portion of the side wall 68 of the boss 63 of the outer member engages, and is cammed by, the wall 67 in the same manner and for the same purpose that the wall 52 engages and is cammed by the wall 51 in Figs. 7 to 9. Thus when the screws 66 are tightened, the coupling members 56 and 57 will be drawn into closer nesting relation to one another and thereby the degree of overrun between the members will be decreased through the camming action on one another of the walls 67 and 68, which draws the hooks 58 and 59 into clamping engagement with the mirror plate 10. At the same time the screws 66 draw the seats 62 and 65 tightly into engagement with the head or ball 25 so as to create a frictional bearing thereon.

The boss 63 of the outer coupling member, in this particular form, is preferably provided with a slot 69 which extends from the aperture 64 upwardly or outwardly and through the upper marginal edge of the boss as shown clearly in Figs. 11 and 13. Thus as the seats 62 and 65 are drawn into engagement with the head or ball 25 by the tightening of the screws 66, the seat 65, which is split by reason of the slot 69, may be sprung apart or open slightly, and since the metal is resilient it will provide a yielding frictional bearing on the ball 25 to compensate for wear while maintaining a tight frictional engagement with the head or ball 25. Thus one may tighten the screws 66 sufficiently to draw the coupling members into firm clamping engagement with the mirror plate without such action being unduly resisted by the ball or head 25.

In Figs. 15 and 16 I have illustrated a different type of resilient seat for the ball or head 25 in place of the rubber disc 39 and the split metal ring 41 of Figs. 5 to 10. This improved, resilient ball seat is a cup-shaped shell 70 of resilient metal, which fits into the cavity 40, Fig. 5, with the open end of the cup of the shell 70 abutting the inner, closed end of the cavity 40. The end face of the shell 70, which would be the bottom of the cup, is provided with a central aperture 72 and with a plurality of slits 73 running from the aperture 72 outwardly a considerable distance toward the periphery of the shell. These slits 73 create fingers 74 radiating toward the center and receive the ball or head 25 and form one seat therefor. When pressure is applied to the ball or head 25 in the cavity 40 by the retaining ring 42, the ball will flex the fingers 74 and thus provide a resilient pressure on the ball which frictionally resists movement of the ball in the cavity 40.

It will be understood that various changes in the details, which have been herein described and illustrated in order to explain the nature of the invention, may be made by those skilled in the art within the principle and scope of the invention as expressed in the appended claims.

I claim:

1. A mounting for a plate such as the reflecting plate of a rear view mirror, which comprises a pair of members disposed face to face and overrunning one another, one of said members having, at its overrunning end, a hook which engages one edge of said plate to be mounted, and the other member at the opposite overrunning end having a hook engaging with the opposite edge of said plate, said members having cooperating cam surfaces causing relative movements of said members in a direction to draw said hooks toward one another when said members are drawn together face to face, means detachably coupling said members and adjustably drawing them together face to face, and means connected to said coupled members for supporting the same in a desired position.

2. A mounting for a plate such as the reflecting plate of a rear view mirror, comprising a pair of sheet metal members disposed face to face and overrunning one another in opposite directions, the overrunning end of one member having a hook which receives and clamps against one edge of said plate when said members are disposed flat against a face of said plate, the overrunning end of the other member also having a hook engaging with the opposite edge of the plate, whereby said members will span a face of said plate and hook over opposite edges thereof, said members having bosses projecting rearwardly therefrom and nesting with one another, but relatively movable to a limited extent in the direction of overrunning, means acting between said members for drawing said members towards one another and concomitantly causing relative movement of said members in said direction of overrunning to draw said hooks towards one another into clamping engagement with said plate, and means connected to the coupled members for supporting the same in a desired position.

3. A mounting for a plate such as the reflecting plate of a rear view mirror, comprising a pair of sheet metal members disposed face to face and overrunning one another at opposite ends, the overrunning end of one member being bent back upon itself to form a hook which may receive and hold one edge of said plate when said members are disposed flat against one face of said plate, the opposite overrunning end of the other member being also bent back upon itself to form a hook which may receive and hold the opposite edge of said plate, the under member having a portion drawn outwardly therefrom at an acute inclination to its face, and the outer member having a portion engaging and sliding on said inclined portion so that when said members are drawn together face to face the engagement of the outer member with said inclined portion will cause said members to move in a direction to draw said hooks toward one another and clamp firmly said plate which is received between them, means for drawing said members together face to face to cause them to clamp said plate, and supporting means articulately connected to said coupled members for supporting said plate and members in different angular positions with respect to said supporting means.

4. A mounting for a plate such as the reflecting plate of a rear view mirror, comprising a pair of sheet metal members disposed face to face and overrunning one another at opposite ends, the overrunning end of one of said members being bent upon itself to form a hook which will engage over one edge of said plate to be mounted when said members are disposed across a face of said plate, the opposite end of the other member being also bent upon itself to form a hook which engages over the opposite edge of said plate, the under member having a boss drawn outwardly therefrom beginning at a distance from its overrunning end, one of the walls of said boss being inclined to the face of said member from which it is drawn, the outer member also having a larger boss drawn therefrom and fitting over the boss on the under member, that side wall of the outer boss which engages the inclined wall of the under member being cammed thereby, when said members are drawn together to cause relative movement of said members in a direction to draw said hooks toward one another into clamping engagement with the opposite edges of said plate which is received between them, means for coupling said members together face to face and for drawing them into closer face to face relation, and supporting means connected to the coupled members.

5. A mounting for a plate such as the reflecting plate of a rear view mirror, comprising a clamping unit formed of two sheet metal plates disposed face to face and each overrunning the other at opposite ends, the overrunning end of one member being formed into a hook to engage over an edge of said plate when said members are disposed against and spanning a face of said plate, the opposite and overrunning end of the other member being also formed as a hook to engage over the opposite edge of said plate, the under member having a tubular boss drawn outwardly therefrom, that side wall of the boss which is nearest to the edge of the plate making an acute inclination to the face of the plate against which that member abuts, the outer member also having a tubular, but larger boss also drawn outwardly therefrom and fitting over the boss of the other member when said members are brought together face to face, the side wall of the boss of the outer member which engages the inclined side wall of the boss of the under member being cammed by said inclined side wall of the under member in a direction to decrease the overrun between said members and draw said hooks toward one another to clamp said plate, when said members are drawn into close contact with one another and with the bosses nesting with one another, means for drawing said members into closer face to face relation to cause such clamping of the hooks to said plate and to complete the unit, and a supporting element articulately connected to said unit for supporting the latter, and through it said plate, while permitting adjustment of said plate and unit into different angular positions with respect to said element.

6. A mounting for a plate such as the reflecting plate of a rear view mirror, comprising a pair of sheet metal members disposed against and spanning one face of said plate to be mounted, the opposite and overrunning ends of said members being formed to clamp and hold said plate by a decrease in the extent of overrun of said members, the under member having a boss drawn outwardly therefrom and the outer member also having a larger boss drawn outwardly therefrom and nesting over the boss of the under member, the end face of the boss of the outer member being apertured and the portion surrounding the aperture being drawn outwardly to form a seat in the form of a segment of a sphere whose center of curvature is within the boss of that member, the end face of the boss of the under member being also drawn downwardly to form a concave seat, a stud having a spherical head confined between said seats and extending outwardly through said aperture, means for drawing said members close together face to face so as to frictionally confine said spherical head between said seats, said bosses having cooperating side walls which cause a decrease in the extent of overrun of said members when said members are drawn together face to face, whereby when said members are drawn together face to face with their bosses nesting to clamp said head, said members will be securely clamped to said plate, the outer member having a slot extending in a direction outwardly from said aperture in its boss, whereby the portions of the outer member engaging such spherical head may yield resiliently as the members are brought together face to face to clamp the same to said plate, and a supporting element to which said stud is connected, whereby said plate will be supported from said element and will be universally adjustable thereon.

7. A mounting for a plate such as the reflecting plate of a rear view mirror, comprising a pair of sheet metal members disposed against and spanning one face of said plate to be mounted, the opposite and overrunning ends of said members being formed to clamp and hold said plate by a decrease in the extent of overrun of said members, the under member having a boss drawn outwardly therefrom and the outer member also having a larger boss drawn outwardly therefrom and nesting over the boss of the under member, said bosses having cooperating side walls which cause a decrease in the extent of overrun of said members when said members are drawn together face to face, the end faces of the nesting bosses having aligned apertures, a cup-shaped element disposed with its closed end abutting the outer face of the boss of the outer member and having a stud extending therefrom through the aperture in the boss of the outer member and threaded into the aperture in the under member, whereby said element and its stud serves as a screw to draw said members into closer face to face relation and cause a decrease in said overrun, a resiliently mounted ball seat provided at the inner end of the cavity of said cup-shaped element, a ball disposed in said cavity against said seat and having a reduced stud extending outwardly through the open end of said element, a retaining ring secured to said element and having an internal flange at its outer end through the opening of which said stud extends, and with the flange forming the outer seat for said ball, whereby said ball will be removably secured in said element, and a supporting member to which said stud is connected.

8. A mounting for a plate such as the reflecting plate of a rear view mirror, comprising a pair of sheet metal members disposed against and spanning one face of said plate to be mounted, the opposite and overrunning ends of said members being formed to clamp and hold said plate by a decrease in the extent of overrun of said members, the under member having a boss drawn outwardly therefrom and the outer member also having a larger boss drawn outwardly therefrom and nesting over the boss of the under member, and means passing between said bosses for drawing them together and concomitantly decreasing the extent of their overrun to clamp said plate between them, and means connected to the coupled members for supporting them and said plate in a desired position.

WILLIAM LA HODNY.